(12) United States Patent
Rafie

(10) Patent No.: US 11,732,555 B2
(45) Date of Patent: Aug. 22, 2023

(54) ADJUSTABLE STRENGTH SHOCK ABSORBER SYSTEM FOR DOWNHOLE BALLISTICS

(71) Applicant: Baker Hughes Oilfield Operations LLC, Houston, TX (US)

(72) Inventor: Saeed Rafie, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 307 days.

(21) Appl. No.: 16/929,627

(22) Filed: Jul. 15, 2020

(65) Prior Publication Data
US 2022/0018225 A1 Jan. 20, 2022

(51) Int. Cl.
- *E21B 43/116* (2006.01)
- *E21B 43/119* (2006.01)
- *F16F 7/00* (2006.01)
- *F16F 7/12* (2006.01)

(52) U.S. Cl.
CPC ........ *E21B 43/119* (2013.01); *E21B 43/116* (2013.01); *F16F 7/003* (2013.01); *F16F 7/12* (2013.01); *F16F 2224/0208* (2013.01); *F16F 2226/04* (2013.01)

(58) Field of Classification Search
CPC ...... E21B 17/07; E21B 43/116; E21B 43/119; F16F 2224/0208; F16F 2226/04; F16F 7/003; F16F 7/12; F16F 9/306
See application file for complete search history.

(56) References Cited

U.S. PATENT DOCUMENTS

| | | | | |
|---|---|---|---|---|
| 3,624,764 A | * | 11/1971 | Goben | F16F 7/121 188/377 |
| 2004/0140090 A1 | * | 7/2004 | Mason | E21B 47/017 175/321 |
| 2007/0095572 A1 | * | 5/2007 | Harvey | E21B 43/117 175/4.6 |
| 2009/0151589 A1 | * | 6/2009 | Henderson | F42D 5/045 102/333 |
| 2012/0255722 A1 | * | 10/2012 | Rodgers | E21B 17/07 166/242.6 |
| 2013/0048376 A1 | * | 2/2013 | Rodgers | E21B 43/1195 175/2 |
| 2014/0305660 A1 | * | 10/2014 | Ash | G01V 1/523 166/381 |
| 2016/0327113 A1 | * | 11/2016 | Shelley | B32B 3/30 |
| 2018/0363402 A1 | * | 12/2018 | Hradecky | E21B 31/1135 |
| 2022/0018225 A1 | * | 1/2022 | Rafie | F16F 7/003 |

FOREIGN PATENT DOCUMENTS

CA 2410844 C * 12/2006 ............. E21B 36/04

* cited by examiner

*Primary Examiner* — Daniel P Stephenson
(74) *Attorney, Agent, or Firm* — Hogan Lovells US LLP

(57) ABSTRACT

A downhole perforation system includes a ballistic device having an first end and a second end, the ballistic device carrying an explosive material. The system further includes a shock absorption device coupled to at least one of the first or second end of the ballistic device and configured to absorb at least a portion of impact energy produced from detonation of the explosive material. The shock absorption device includes a shock absorption module which includes a viscoelastic body and a rigid structure molded within the viscoelastic body. The rigid structure is configured to break or deform when impacted by a threshold amount of impact energy. Broken or deformed portions of the rigid structure are contained within the viscoelastic body.

20 Claims, 4 Drawing Sheets

ADJUSTABLE STRENGTH SHOCK ABSORBER SYSTEM FOR DOWNHOLE BALLISTICS

BACKGROUND

1. Field of Invention

This disclosure relates in general to oil and gas tools, and in particular, to systems and methods for damping downhole ballistics.

2. Description of the Prior Art

Perforating systems may be used for the purpose, among others, of making hydraulic communication passages, called perforations, in wellbores drilled through earth formations so that predetermined zones of the earth formations can be hydraulically connected to the wellbore. Perforations are utilized because wellbores are typically completed by coaxially inserting a pipe or casing into the wellbore. The casing is retained in the wellbore by pumping cement into the annular space between the wellbore and the casing. The cemented casing is provided in the wellbore for the specific purpose of hydraulically isolating from each other the various earth formations penetrated by the wellbore. Perforating systems may include ballistic charges that form passages through the cemented casing, thereby enabling flow into an annulus of the wellbore. The amount of impact energy released by ballistic guns and devices in oil and gas perforating is capable of producing irrecoverable catastrophic damages not only to the equipment (i.e. electronics embedded inside the tool, threaded connections, deployment system, tensile bar, wireline logging cable, etc.), in some cases they may adversely affect the structural integrity of the wellbore if they are not controlled, attenuated or absorbed.

SUMMARY

Applicant recognized the problems noted above herein and conceived and developed embodiments of systems and methods, according to the present disclosure, for perforating gun conveyance.

In an embodiment, a downhole perforation system includes a ballistic device having an first end and a second end, the ballistic device carrying an explosive material. The system further includes a shock absorption device coupled to at least one of the first or second end of the ballistic device and configured to absorb at least a portion of impact energy produced from detonation of the explosive material. The shock absorption device includes a shock absorption module which includes a viscoelastic body and a rigid structure molded within the viscoelastic body. The rigid structure is configured to break or deform when impacted by a threshold amount of impact energy. Broken or deformed portions of the rigid structure are contained within the viscoelastic body.

In another embodiment, a downhole ballistic shock absorption device includes a shock absorption module, which includes a viscoelastic body and a rigid structure molded into the viscoelastic body. The rigid structure is configured to break or deform when impacted by a threshold amount of impact energy, and broken or deformed portions of the rigid structure are contained within the viscoelastic body. The shock absorption device may further include one or more spring structures coupled to the shock absorption module. In some embodiments, the rigid structure is made of a porous metal material. In some embodiments, the rigid structure is made of a metal mesh. In some embodiments, the rigid structure is made through an additive manufacturing process. In some embodiments, the entire volume of the viscoelastomeric body is taken up by either viscoelastomeric material or the rigid structure. In some embodiments, a design of the rigid structure is based on the threshold impact energy and one or more specifications of the ballistic device. In some embodiments, the shock absorption device further includes one or more spring structures coupled to the shock absorption module. In some embodiments, the shock absorption device further includes a plurality of the shock absorption module.

In another embodiment, a method of downhole ballistics damping includes positioning a ballistics device in a target portion of a well, wherein the ballistics device is a part of a tool string, detonating one or more charges from the ballistic device, the detonation generating an amount of impact energy, receiving at least a portion of the impact energy by a shock absorption device on the tool string, the shock absorption device comprising a rigid structure and an elastic body molded around the rigid structure, deforming or breaking the rigid structure due to the received impact energy, and reducing the impact energy transferred to another portion of the tool string. In some embodiments, broken or deformed portions of the rigid structure are contained within the elastomeric body.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

Figure 1:
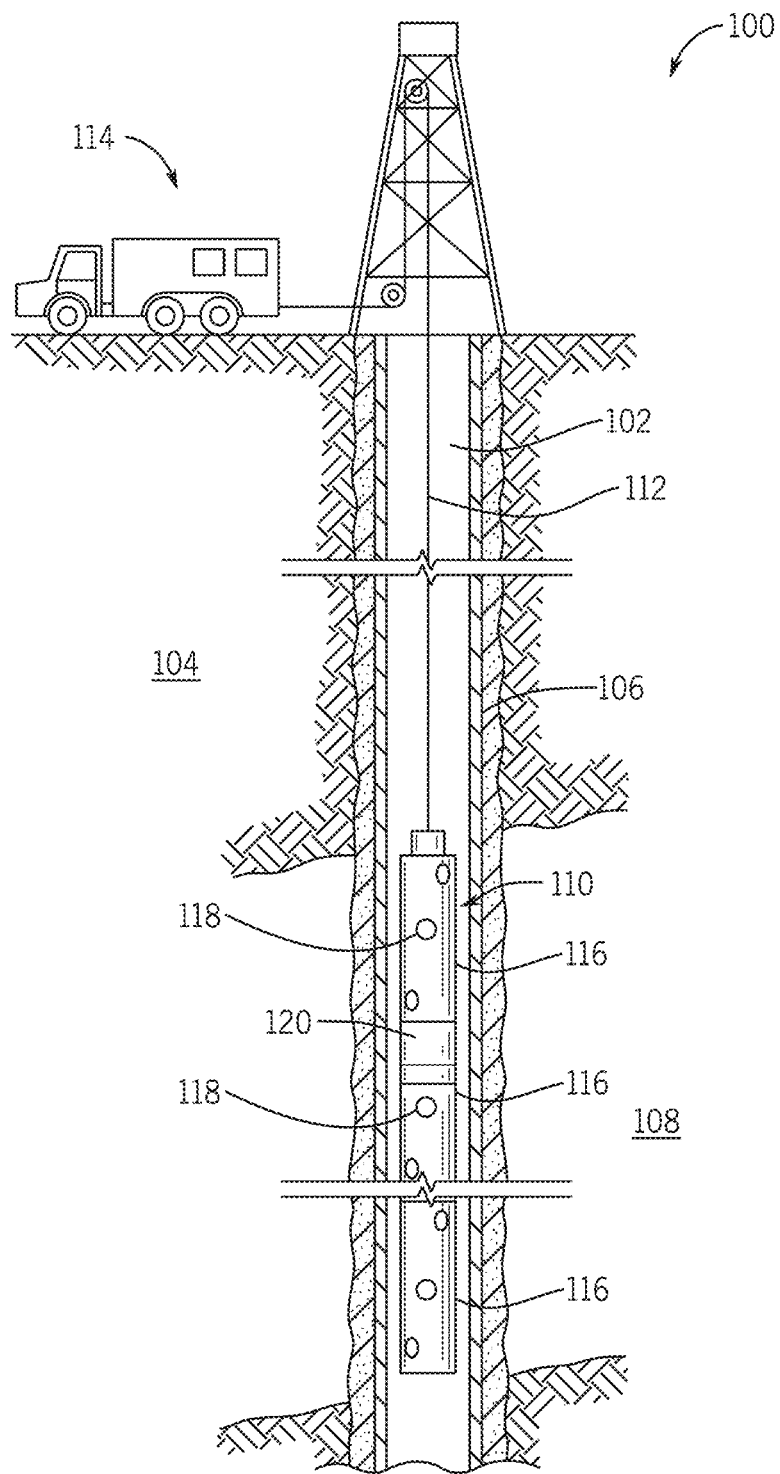
FIG. 1 is a schematic cross-sectional view of an embodiment of a perforating string within a wellbore, in accordance with example embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure include a shock absorption module for downhole ballistics systems. The shock absorption module includes a rigid structure molded within viscoelastic material, such that impact energy causes the rigid structure to deform or break and thereby absorb some of the impact energy and prevent the energy from being passed to other equipment or the environment.

FIG. 1 is a schematic cross-sectional view of a well site 100 including a wellbore 102 extending into a downhole formation 104. The illustrated wellbore 102 includes a casing 106 extending along at least a portion of a length thereof, thereby forming a cased wellbore. In various embodiments, there may be cement positioned between the casing 106 and the formation 104, thereby securing the casing 106 in place. The illustrated formation 104 includes a recoverable or target section 108, which may include recoverable oil and gas products.

In the illustrated embodiment, a perforating system 110 is conveyed into the wellbore 102 using a wireline 112. While the perforating system 110 in the illustrated embodiment is conveyed via the wireline 112, it should be appreciated that tubing, slickline, and other deployment means, may be used as alternatives for the wireline 112. In the embodiment of FIG. 1, a surface truck 114 is provided at the surface for control and/or operation of the perforating system 110. The illustrated perforating system 110 includes a plurality of perforating guns 116. It should be appreciated that, in various embodiments, the perforating system 110 may include one, two, three, four, five, ten, twenty, or any other number of perforating guns 116. Moreover, the perforating system 110 may include other components, such as delays, intermediate subs, controllers, and the like, which have been omitted for clarity with the present discussion. In operation, shaped charges 118 provided in the perforating guns 116 may be detonated within the wellbore 102 to create perforations (not shown).

One or more shock absorption devices 120 may be positioned at an end of a perforating gun 116, such as in between two perforating guns 116. In some embodiments, there may be one or more shock absorption devices 120 positioned between each perforating gun 116 in a string of perforating guns 116. In some embodiments, a shock absorption device may be placed at an uphole end of a string of perforating guns, between the gun string and other equipment or cables of an overall downhole string. In some embodiments, a plurality of shock absorption devices 120 may be arranged consecutively. When the perforating guns 116 are fired, a large amount of impact energy is released which may traverse the entirety or portions of the tool string. Such impact energy, if not mitigated, may be capable of causing damage to the other equipment on the tool string. In some cases, the impact energy may adversely affect the structural integrity of the wellbore as well if it is not mitigated. The shock absorption devices 120 acts to attenuate or absorb some of the impact energy released during firing of the perforation guns 116, and thus protect the tool string and the well environment from the deleterious effects of the impact energy.

Figure 2:
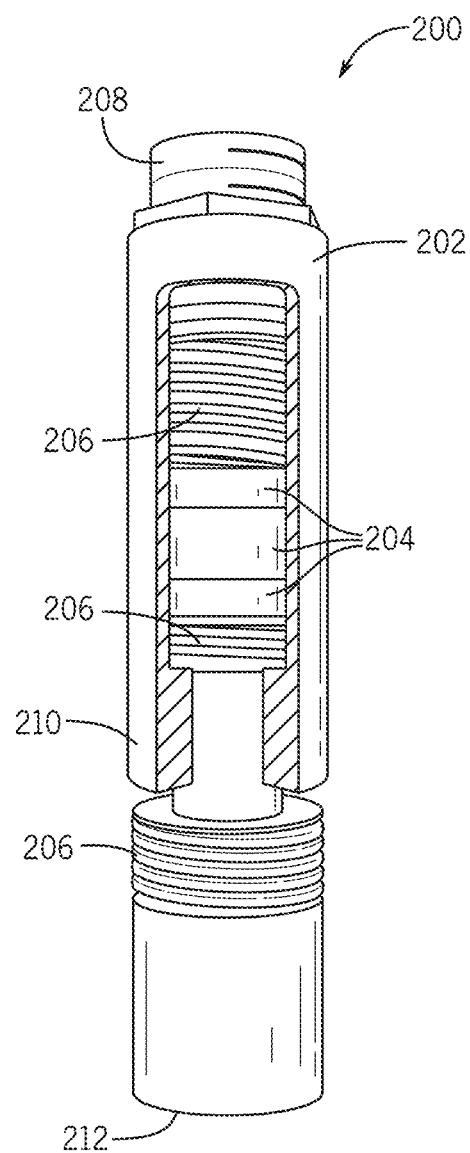
FIG. 2 illustrates an example of a shock absorption device with a partial internal view, in accordance to example embodiments.

FIG. 2 illustrates an example of a shock absorption device 200 with a partial internal view, in accordance to an example embodiment. The shock absorption device 200 includes a first end 208 and a second end 212 by which the shock absorption device 200 can be coupled to another portion of a downhole string, such as perforating gun 116 (FIG. 1), a cable, or other tool. The first and second ends 208, 212 may be designed for various types of mating mechanisms, such as threaded connection, latching connection, among others. In some embodiments, the shock absorption device 200 includes one or more spring mechanism 206 at various positions between the first end 208 and the second end 212, such that energy transferred between the two ends at least partially travels through the one or more spring mechanisms 206 and is thus partially dampened. For example, the one or more spring mechanisms 206 may include heavy duty coil springs.

The shock absorption device 200 also includes one or more a shock absorption modules 204. A portion of the impact energy is transferred to the sacrificial shock absorption module, which is made of a shape-changing (e.g., elastomeric) material and a deformable or crushable structure within the shape-changing material. Specifically, in some embodiments, each shock absorption module includes a viscoelastic body and a rigid structure molded within the viscoelastic body. When impact by a threshold amount of impact energy, the rigid structure deforms or breaks into pieces, thereby absorbing, rather than continuing to transfer, some of the impact energy. In some embodiments, the rigid structure experiences plastic deformation, or a permanent deformation. The broken or deformed portions of the rigid structure are contained within the viscoelastic body.

Figure 3:
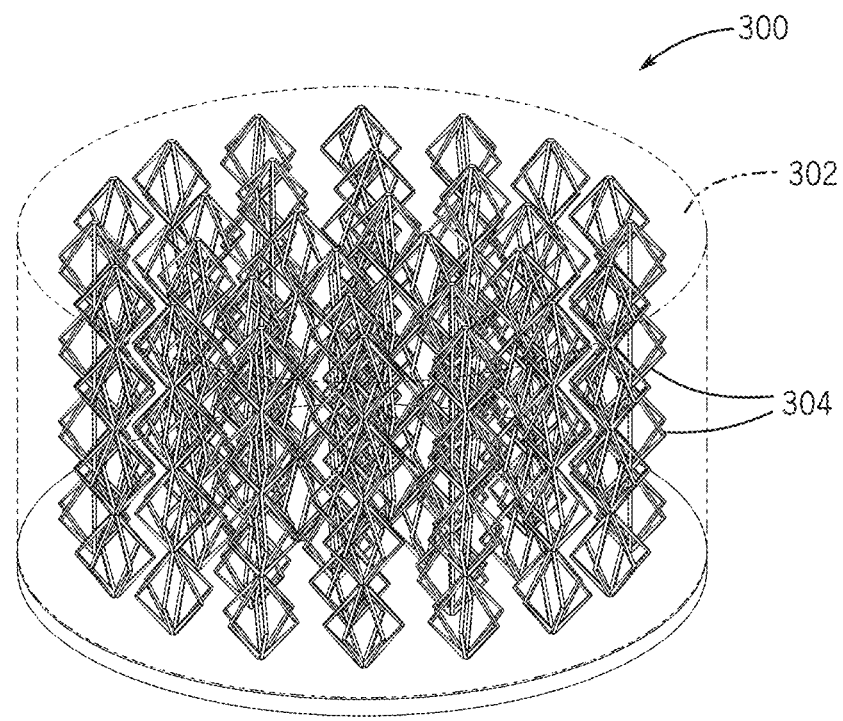
FIG. 3 illustrates such a shock absorption module with the viscoelastic body shown semi-transparently so that the internal rigid structure can be illustrated, in accordance with example embodiments.

FIG. 3 illustrates such a shock absorption module 204 with the viscoelastic body 302 shown semi-transparently so that the internal rigid structure 304 can be illustrated, in accordance with example embodiments. The viscoelastic body 302 may be made of a nano viscoelastic material rated for high temperatures. The viscoelastic body 302 serves to attenuate some of the impact energy and hold the broken or deformed pieces of the rigid structure 304 in place within the body 302. In some embodiments, the entire volume of the viscoelastomeric body 302 is taken up by either viscoelastomeric material or the rigid structure 304, as in the viscoelastomeric body 302 is fully molded around the rigid structure 304.

Materials used in the shock absorption module should also be able to withstand harsh downhole environments such as temperatures above 350° F. and pressures above 25 Kpsi, as well as high impact loads generated by the perforating guns. The viscoelastic body 302 may be designed to have various specifications such as how much force is required to compress it, how much it will compress, and the like. Various different materials or blends of materials may be used to achieve the desired specifications. In some embodiments, the viscoelastic body 302 may be replaced by a body of a different type of compressive property and is not limited to viscoelastic materials.

Figure 4:
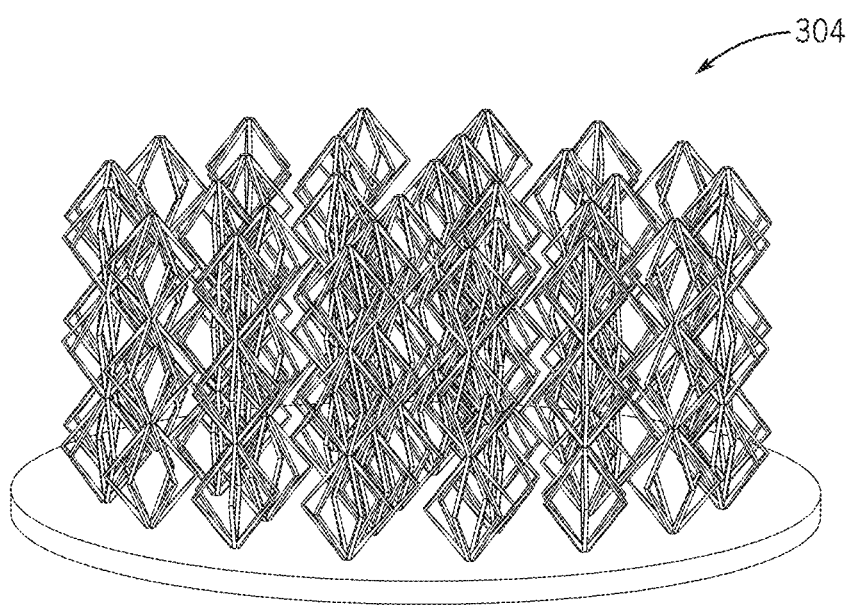
FIG. 4 illustrates the rigid structure by itself, without the viscoelastic body 302 molded over it, in accordance with example embodiments.

FIG. 4 illustrates the rigid structure 304 by itself, without the viscoelastic body 302 molded over it, in accordance with example embodiments. In some embodiments, rigid structure is made of a metallic material and designed to deform or break under a threshold amount of impact energy. The deformation of breaking of the rigid structure 304 absorbs at least a portion of the impact energy, and thus helps in the overall damping efforts of the shock absorption device 200.

The rigid structure 304 may be made of a porous metal material, metal foam, metal mesh, or the like. The rigid structure 304 may alternatively be made of plastic and designed to break when impacted with a certain amount of energy. In some embodiments, the rigid structure 304 is made through an additive manufacturing process. The shape and design of the rigid structure 304 can be selected based on desired deformation or breaking conditions. For example, the rigid structure 304 may be designed to deform or break in a particular way, at certain locations, into a certain number of pieces, under certain amounts of impact energy, among other facets. Thus, an advantage of the shock absorption module is the ability to adjust and calibrate the damping properties by changing its structural configuration and mesh geometry.

The illustrated example shock absorption module 300 has a cylindrical shape, as most downhole tools have a generally cylindrical shape. However, the shock absorption may have any type of a three dimensional shape in which a viscoelastomeric body is molded around a rigid three dimensional structure that can be deformed or broken when compressed with a sufficient amount of force. For example, the shock absorption module 300 can be a cube, a sphere, among other geometrically regular or irregular shapes.

In the example embodiment illustrated in FIG. 2, the shock absorption device includes three shock absorption modules 204 positioned in series and placed inside a spring loaded piston assembly. A portion of a housing 202 or covering is cutaway to show the internal components, which includes spring mechanism 206 and the shock absorption modules 204. Specifically, the shock absorption modules 204 are positioned in between two spring mechanisms 206. When a perforation gun is fired, the impact energy may cause the first and second ends of the device 200 to compress towards each other, thus compressing the spring mechanisms 206 and eventually compressing the shock absorption modules 204. Compression of the shock absorption modules 204 causes the internal rigid structure to deform or break, thus absorbing some of the energy. The device 200 of FIG. 2 in an example implementation of the shock absorption modules 204 described in the present disclosure. 1 In other embodiments, the above described shock absorption modules 204 may be used in various types of tools and in various configurations with respect to a ballistics system.

In some embodiments, the shock absorption module 300 is a sacrificial element because once the internal rigid structure 304 is deformed or broken, the shock absorption module 300 is consumed. In some embodiments, the ballistics system may include many such shock absorption modules 300 and only a subset is consumed during a detonation event. The remaining shock absorption modules 300 may be consumed on subsequent detonation events. In some embodiments, it may require more than one detonation event to fully consume a shock absorption module 300.

Figure 5:
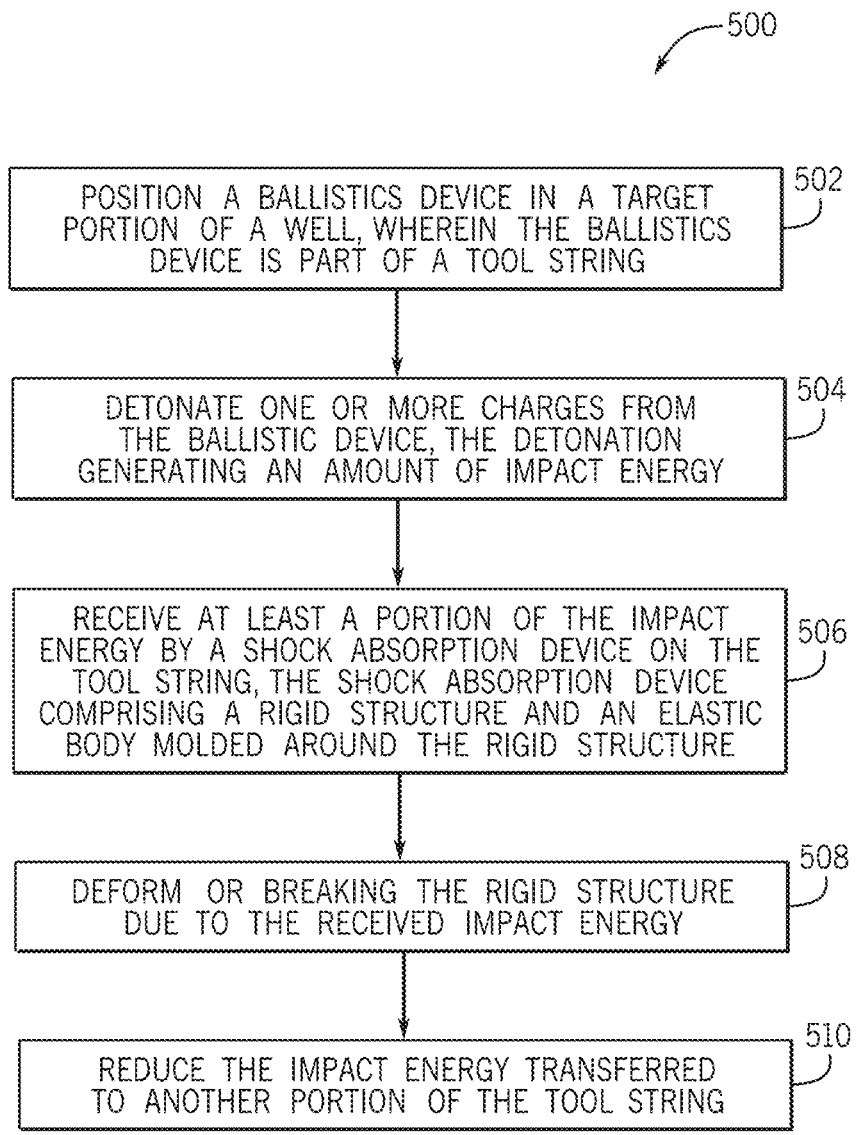
FIG. 5 is a flow chart of a method of downhole ballistics with damping, in accordance with example embodiments.

FIG. 5 is a flow chart of a method 500 of downhole ballistics with damping, in accordance with example embodiments. It should be appreciated that the steps described in the method may be performed in parallel or in a different order, unless otherwise explicitly stated. Furthermore, in various embodiments, there may be more or fewer steps. Additionally, in certain embodiments, one or more steps may be omitted. In this example, the method includes positioning (502) a ballistics device in a target portion of a well. The ballistics device may include one or more perforating guns and is a part of a tool string that includes various other tools and components suspended on a cable (i.e., wireline). The method further includes detonating (504) one or more charges from the ballistic device. The detonation generate an amount of impact energy which may travel along the tool string and affect the other tools and components on the tool string as well as the non-target portions of the well environment. At least a portion of the impact energy is received (506) by a shock absorption device on the tool string. The shock absorption device includes a rigid structure and an elastic body molded around the rigid structure. The method further includes deforming or breaking (508) the rigid structure inside the elastomeric material due to the received impact energy, and thereby reducing (510) the amount of impact energy transferred to other portions of the tool string. In some embodiments, broken or deformed portions of the rigid structure are contained within the elastomeric body. In some embodiments, the shock absorption device further includes spring loaded mechanisms to further attenuate the impact energy.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A downhole perforation system, comprising:
a ballistic device having a first end and a second end, the ballistic device carrying an explosive material; and
a shock absorption device coupled to at least one of the first or second end of the ballistic device and configured to absorb at least a portion of impact energy produced from detonation of the explosive material, the shock absorption device comprising:
a shock absorption module comprising:
a viscoelastic body; and
a rigid structure molded within the viscoelastic body, the rigid structure configured to break or at least partially plastically deform when impacted by a threshold amount of impact energy, wherein broken or deformed portions of the rigid structure are contained within the viscoelastic body.

2. The downhole perforation system of claim 1, wherein the rigid structure is made of a porous metal material.

3. The downhole perforation system of claim 1, wherein the rigid structure is made of a metal mesh.

4. The downhole perforation system of claim 1, wherein the rigid structure is made through an additive manufacturing process.

5. The downhole perforation system of claim 1, wherein the entire volume of the viscoelastomeric body is taken up by either viscoelastomeric material or the rigid structure.

6. The downhole perforation system of claim 1, wherein a design of the rigid structure is based on the threshold impact energy and one or more specifications of the ballistic device.

7. The downhole perforation system of claim 1, wherein the shock absorption device further comprising one or more spring structures coupled to the shock absorption module.

8. The downhole perforation system of claim 1, wherein the shock absorption device comprises a plurality of the shock absorption module.

9. A downhole ballistic shock absorption device, comprising:
- a shock absorption module, comprising:
  - a viscoelastic body; and
  - a rigid structure molded into the viscoelastic body, the rigid structure configured to break or at least partially plastically deform when impacted by a threshold amount of impact energy, wherein broken or deformed portions of the rigid structure are contained within the viscoelastic body.

10. The downhole ballistic shock absorption device of claim 9, wherein the rigid structure is made of a porous metal material or a metal mesh.

11. The downhole ballistic shock absorption device of claim 9, wherein the rigid structure experiences plastic deformation when impacted by the threshold amount of impact energy.

12. The downhole ballistic shock absorption device of claim 9, wherein the rigid structure is made through an additive manufacturing process.

13. The downhole ballistic shock absorption device of claim 9, wherein the entire volume of the viscoelastomeric body is taken up by either viscoelastomeric material or the rigid structure.

14. The downhole ballistic shock absorption device of claim 9, further comprising: the shock absorption device further comprising one or more spring structures coupled to the shock absorption module.

15. A method of downhole ballistics damping, comprising:
- positioning a ballistics device in a target portion of a well, wherein the ballistics device is a part of a tool string;
- detonating one or more charges from the ballistic device, the detonation generating an amount of impact energy;
- receiving at least a portion of the impact energy by a shock absorption module on the tool string, the shock absorption module comprising a rigid structure and an elastic body molded around the rigid structure;
- at least partially plastically deforming or breaking the rigid structure due to the received impact energy; and
- reducing the impact energy transferred to another portion of the tool string.

16. The method of claim 15, wherein the rigid structure is made of a porous metal material.

17. The method of claim 15, wherein the rigid structure is made of a metal mesh.

18. The method of claim 15, wherein the rigid structure is made through an additive manufacturing process.

19. The method of claim 15, wherein the entire volume of the elastomeric body is taken up by either elastomeric material or the rigid structure.

20. The method of claim 15, wherein broken or deformed portions of the rigid structure are contained within the elastomeric body.

* * * * *